United States Patent [19]

Carstens

[11] Patent Number: 4,863,201
[45] Date of Patent: Sep. 5, 1989

[54] COUPLING ASSEMBLY

[75] Inventor: Felix Carstens, Kaiserslauteru, Fed. Rep. of Germany

[73] Assignee: Hall Surgical Division of Zimmer, Inc., Capinteria, Calif.

[21] Appl. No.: 338,481

[22] Filed: Apr. 13, 1989

Related U.S. Application Data

[63] Continuation of Ser. No. 926,591, Nov. 3, 1986, abandoned.

[51] Int. Cl.⁴ .............................................. F16L 37/22
[52] U.S. Cl. .................................... 285/317; 285/308; 251/149.6
[58] Field of Search ................. 285/23, 308, 317, 924; 251/149.6, 149.2, 149.9; 137/614.02, 614.03, 614.04

[56] References Cited

U.S. PATENT DOCUMENTS

| | | | |
|---|---|---|---|
| 793,103 | 6/1905 | Scholtz | 285/317 |
| 2,099,335 | 11/1937 | Hansen | 285/308 |
| 2,771,308 | 11/1956 | Vitcha et al. | 285/317 |
| 3,453,005 | 7/1969 | Foults | 285/924 |
| 4,366,945 | 1/1983 | Bläuenstein | 285/924 |
| 4,413,846 | 11/1983 | Oetiker | 285/924 |
| 4,483,510 | 11/1984 | Palau et al. | 285/924 |
| 4,541,457 | 9/1985 | Blenkush | 285/924 |
| 4,576,359 | 3/1986 | Oetiker | 285/317 |
| 4,613,112 | 9/1986 | Phlipot et al. | 285/317 |
| 4,703,958 | 11/1987 | Fremy | 285/317 |

Primary Examiner—Randolph A. Reese
Assistant Examiner—Anthony Knight
Attorney, Agent, or Firm—Stuart E. Krieger

[57] ABSTRACT

A coupling assembly includes a female coupling member that can be connected to a fluid supply source and a male coupling member that can be quickly coupled to the female coupling member and quickly separated from the female coupling member. A pair of spaced latching members provided on the female coupling member move transversely with respect to a longitudinal axis of the coupling assembly into and out of engagement with one or more latch engaging surfaces on the male coupling member. The latching members have openings that are out of alignment with each other. An actuating button on the female coupling member is arranged to move the latching members in predetermined fasion to permit the openings in each of the latching members to sequentially interfere with the latch engaging surface or surfaces on the male coupling member to establish sequential latching positions. The sequential latching positions permit placement of the coupling assembly in a fluid flow position, a depressurization position and an unlatched position which permits separation of the coupling members. A further embodiment of the invention permits placement of the coupling assembly in an intermediate position between the fluid flow position and the depressurization position wherein the coupling assembly remains pressurized but fluid flow is shut off. The further embodiment includes a pair of stop surfaces on the male coupling members which interengage with the latching members. The coupling assembly is thus depressurized while the coupling members are latched together and a single actuation of the actuating button permits the coupling assembly to pass through each of the latching positions in a predetermined sequence before the coupling members are unlatched. Quick and safe uncoupling is thus accomplished.

22 Claims, 7 Drawing Sheets

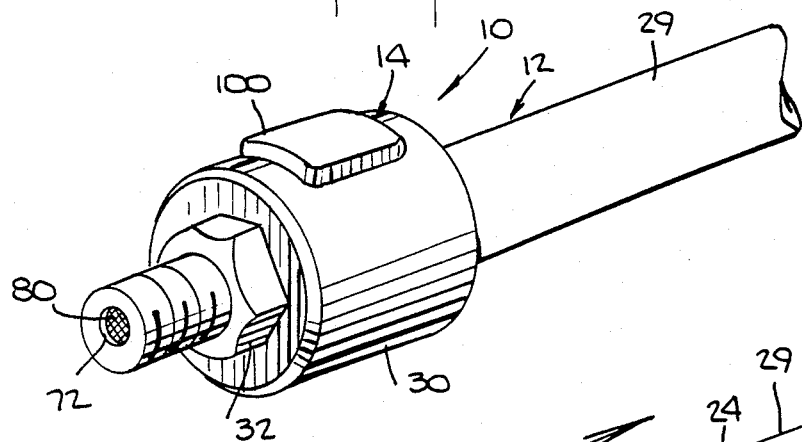
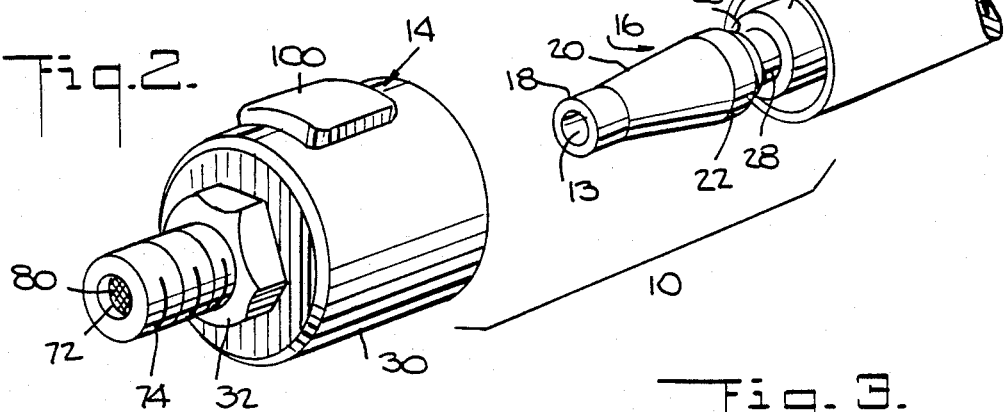
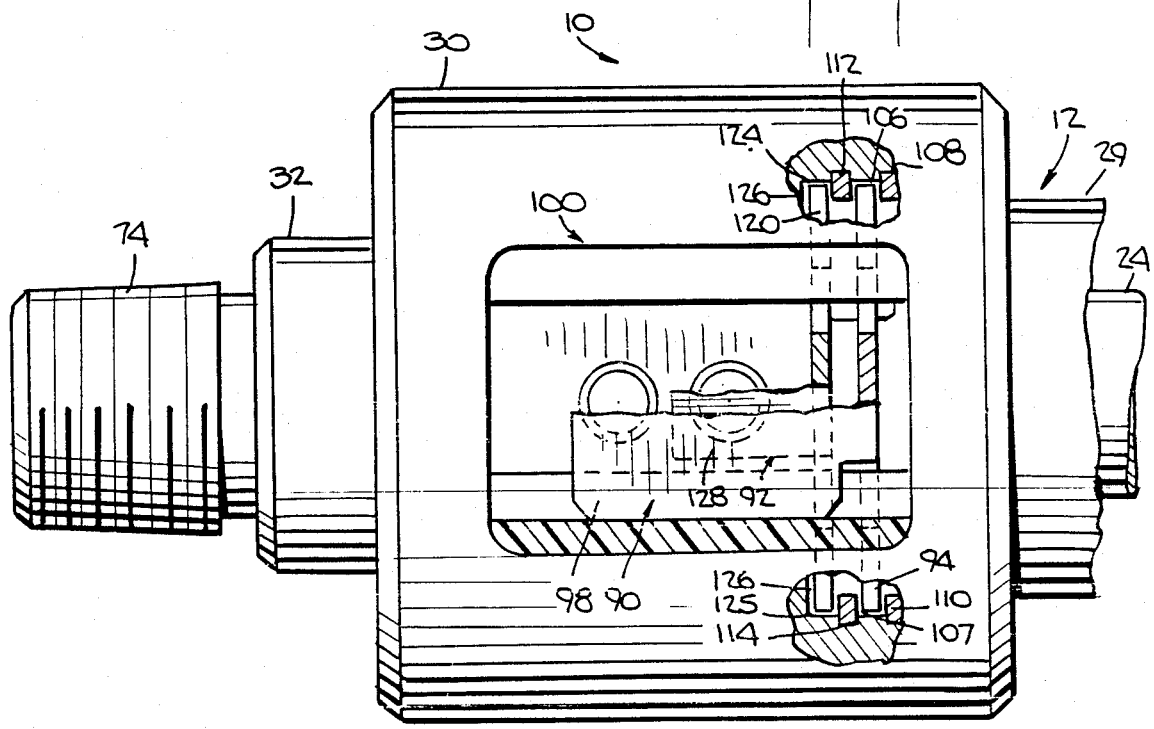

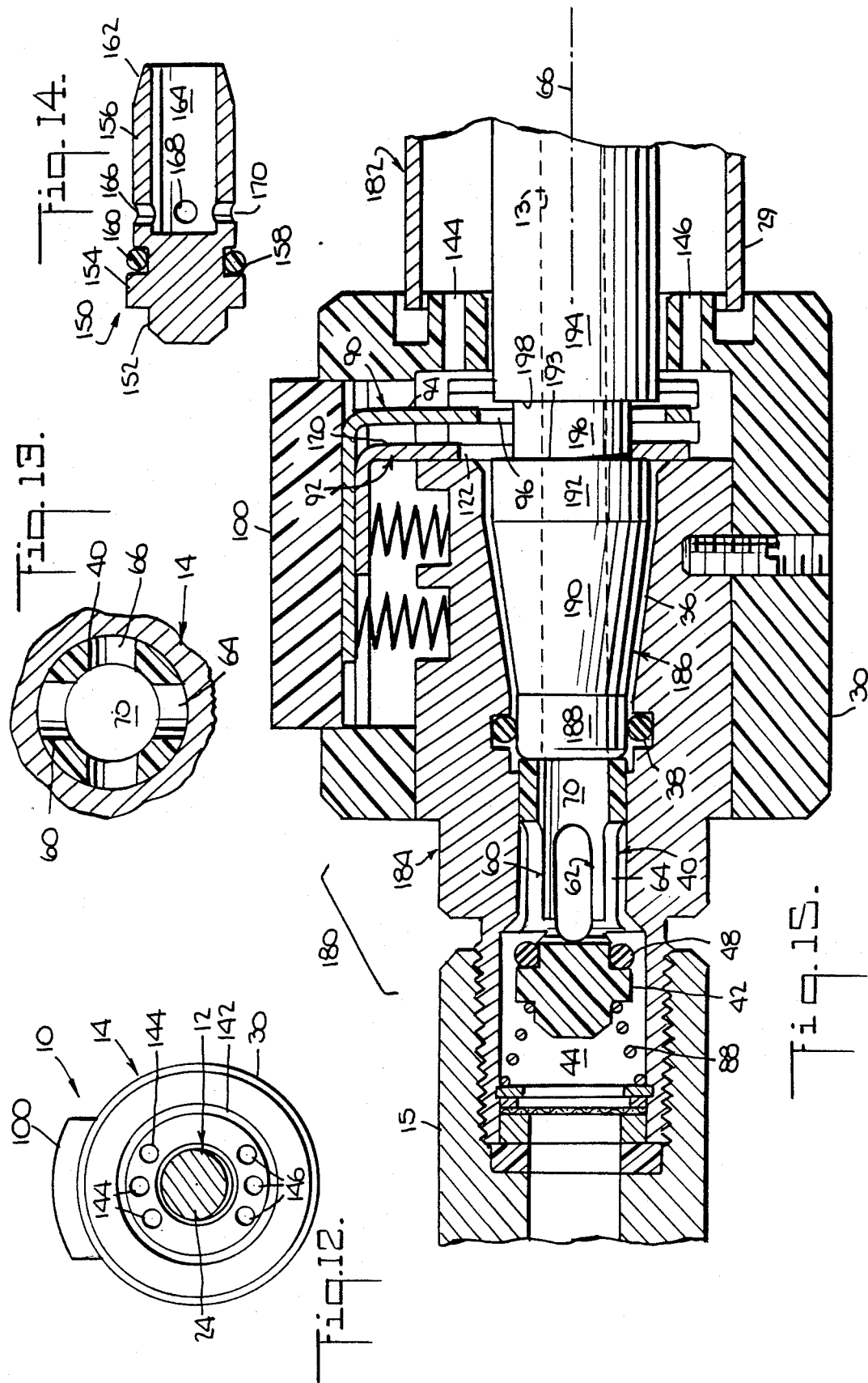

COUPLING ASSEMBLY

This is a continuation of application Ser. No. 926,591 filed Nov. 3, 1986 now abandoned.

BACKGROUND OF THE INVENTION

This invention relates to coupling members that can be quickly latched together and disconnected, and more particularly to a novel coupling assembly that can be depressurized while the coupling members are latched together to permit safe and easy separation of the coupling members.

As used herein the terms "depressurize", "depressurization of the coupling assembly" and "depressurization of the coupling members" are intended to refer to a rapid loss of pressure by one of two coupling members.

Quick disconnect coupling assemblies afford instant utilization of a fluid supply source and allow the fluid supply source to be interconnected with different fluid outlets. Some fluid supply sources, such as pressurized gas tanks will cause a relatively high pressure buildup across the coupling members. Consequently, a quick disconnection of the coupling assembly usually results in a rapid depressurization of the coupling member that is disconnected from the fluid supply source. During such depressurization the coupling member which loses pressure has a tendency to "shoot away" from the other coupling member due to the forces generated when there is a rapid release of pressure.

Because of the risk of injury when one coupling member "shoots away" from another coupling member during disconnection of high pressure couplings, special techniques have been developed for safely disconnecting coupling assemblies that join with a high pressure fluid supply. Such techniques usually require a combination of strength and skill, thus limiting the handling of high pressure couplings to select individuals even though numerous other personnel may be qualified to operate other parts of a fluid flow system that incorporates the high pressure couplings.

One known structure for dealing with the problem of "shoot-away" couplings, as shown in U.S. Pat. No. 4,483,510, is a coupling assembly with a two-stage release mechanism for disconnecting the coupling members. During the first stage of release, a locking element is actuated to permit movement of one of the coupling members away from the other coupling member to an intermediate locked position. As the actuator returns to its original unactuated position, the movable coupling member shifts to a second locked position wherein depressurization can take place. A subsequent actuation of the locking element frees the moveable coupling member to permit disconnection from the coupling assembly.

Although depressurization occurs while the coupling members are locked together, the need to actuate the locking element more than once to accomplish a safe disconnection can be confusing because most coupling assemblies are separable with one actuation of an actuating mechanism.

Another known coupling assembly as shown in U.S. Pat. No. 4,541,457 requires unthreading of the coupling members after fluid flow has been shut off by a poppet valve in the coupling assembly. Although the coupling assembly depressurizes during the unthreading process, there is no quick disconnection of the coupling members.

It is thus desirable to provide a reusable, quick disconnect coupling assembly that can be depressurized with the coupling members latched together and requires only one actuation of a release mechanism to depressurize and separate the coupling members.

OBJECTS AND SUMMARY OF THE INVENTION

Among the several objects of the invention may be noted the provision of a novel coupling assembly, a novel coupling assembly that can be safely and easily uncoupled without one of the coupling members shooting away from the other coupling member, a novel coupling assembly that is depressurized while the coupling members are latched together, a novel coupling assembly that can be depressurized and the coupling members separated from each other with one actuation of an actuating member, a novel coupling assembly that requires release of an actuating member after it has been depressed before the coupling members can be separated, and a novel method for safely disconnecting a coupling assembly.

Other objects and features of the invention will be in part apparent and in part pointed out hereinafter.

In accordance with the present invention, the coupling assembly includes a pair of interengageable and separable coupling members. Moveable latching means are provided on one of the coupling members to engage with latch engaging means provided on the other coupling member. Cooperation between the latching means and the latch engaging means enable the coupling assembly to be placed in at least two separate positions such as a fluid flow position which permits movement of fluid through the coupling members and a depressurization position wherein fluid cannot flow through the coupling members and the coupling assembly depressurizes.

In another embodiment of the invention, the latching means and the latch engaging means cooperate to position the coupling assembly in an intermediate position between the fluid flow position and the depressurization position wherein the coupling assembly remains under pressure but fluid flow is shut off.

Actuating means are provided on one of the coupling members for actuating movement of the latching means in a first direction when the coupling assembly is in the fluid flow position. The actuating means moves the latching means from the first latching position to a second latching position to permit placement of the coupling members in the depressurization position. Biasing means that cooperate with the actuating means return the actuating means to its initial position to permit movement of the coupling members from the depressurization position to an unlatched position that allows separation of the coupling members.

In the preferred embodiment of the invention, the latching means are provided on the female coupling member and the latch engaging means are provided on the male coupling member. The latch engaging means are operable by the actuating means to move transversely to a longitudinal axis of the coupling assembly. The latching means include a pair of latching members that are engageable, in sequence with at least one stop surface provided on the male coupling member.

Engagement of one of the latching members with the stop surface locks the coupling assembly in the fluid flow position, and engagement of the other latching member with the stop surface locks the coupling assembly in the depressurization position.

The latching members have opening therein which are sized to clear the male coupling member. However, the openings in the latching members are out of alignment with each other by a predetermined amount such that when one of the openings in one of the latching members clears the male coupling member the other opening in the other latching member interferes with the male coupling member.

In this manner the interference between at least one of the latching members and the male coupling member results in an engagement between one latching member and the stop surface on the male coupling member to lock the coupling assembly in a predetermined position.

In the other embodiment of the invention, the male coupling member includes two stop surfaces which cooperate with the two latching members to establish three latching positions of the coupling assembly, the additional latching position being the intermediate position wherein the coupling assembly remains pressurized but the fluid flow through the coupling assembly is shut off.

In either embodiment of the invention the actuating member which controls movement of the latching members is actuated only once to accomplish movement of the coupling assembly from the fluid flow position to the depressurization position, to the unlatched position.

In the embodiment of the invention which permits the intermediate latching position between the fluid flow position and the depressurization position, a single actuation of the actuating member will likewise permit movement of the coupling assembly through the three latching positions and the unlatched position that permits separation of the coupling members.

The coupling assembly can thus be quickly depressurized and unlatched with a single actuation of the actuating member in a safe manner by individuals having no special skills or strength.

The invention accordingly comprises the constructions and method hereinafter described, the scope of the invention being indicated in the claims.

DESCRIPTION OF THE DRAWINGS

In the accompanying drawings, in which several embodiments of the invention are illustrated, FIG. 1 is a simplified perspective view of a coupling assembly incorporating one embodiment of the present invention;

FIG. 2 is a perspective view thereof, with the coupling members separated from each other;

FIG. 3 is an enlarged fragmentary plan view thereof, partly shown in section;

FIG. 12 is a sectional view taken along the line 12—12 of FIG. 10;

FIG. 13 is a sectional view taken along the line 13—13 of FIG. 10;

FIG. 14 shows a modified poppet valve thereof; and,

FIG. 15 is a fragmentary sectional view of another embodiment of the invention.

Corresponding reference characters indicate corresponding parts throughout the several views of the drawings.

DETAILED DESCRIPTION OF THE INVENTION

Figure 4:
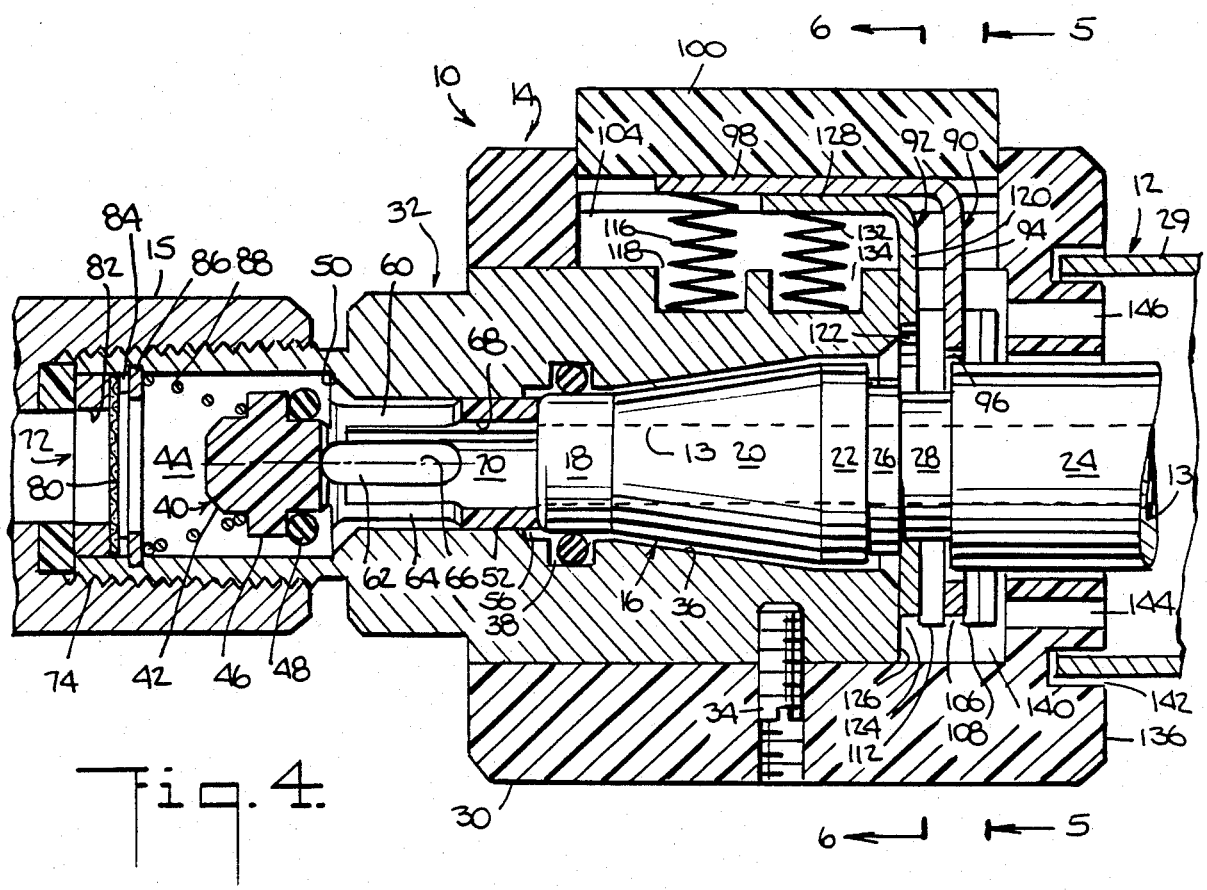
FIG. 4 is an enlarged fragmentary sectional view thereof, with the coupling members engaged to permit fluid-flow.

Referring to the drawings, a coupling assembly incorporating one embodiment of the invention is generally indicated by the reference number 10 in FIG. 1.

The coupling assembly 10 comprises a hollow male coupling 12 which defines a fluid passage 13, and a female coupling 14. Each of the coupling members are engagable with respective fluid flow lines of connections such as line 15, which is threaded to the female coupling 14.

The male coupling member 12, which can be formed as an integral unit, preferably from stainless steel, includes a nipple 16. As most clearly shown in FIG. 11, the nipple 16 has a reduced finished end 18, a tapered camming section 20 and a narrow section 22. The narrow section 22 is spaced from an enlarged elongated section 24 of identical diameter by annular steps 26 and 28. The steps 26 and 28 form a channel between the narrow and elongated sections 22 and 24, with the step 26 being narrower and of greater diameter than the step 28. An annular collar 29 surrounds the elongated section 24 and can be formed integrally with the elongated section 24.

Figure 11:
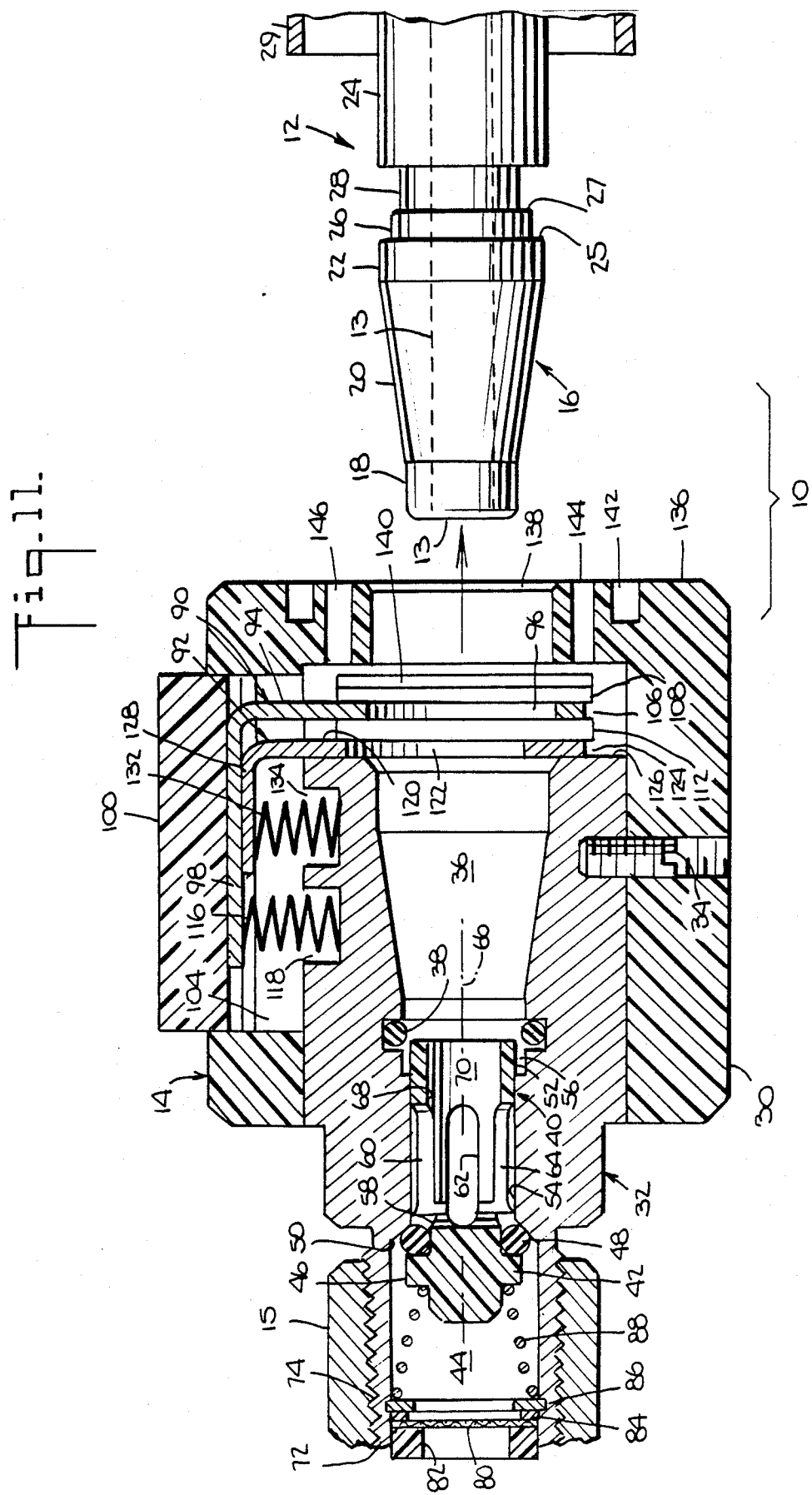
FIG. 11 is an enlarged fragmentary sectional view of the coupling members separated from each other.

The female coupling member 14, which is shown separate from the male coupling member 12 in FIG. 11, includes a sleeve 30 which can be formed of plastic such as sold under the designation DELRIN, joined to a coupling body 32 by a set screw 34. The coupling body 32, preferably formed from stainless steel, includes a nipple recess portion 36 (FIG. 11) of complementary size and shape with the nipple 16 to slidably accommodate the nipple 16 of the male coupling 12. An O-ring 38 is provided in the coupling body 32 at the reduced end of the nipple recess 36.

A poppet valve 40, which can also be formed of DELRIN plastic, includes a head portion 42 retained in an inlet space 44 of the coupling body 12. The head portion 42 is formed with a flange 46. An O-ring 48 is provided between the flange 46 and a tapered surface 50 of the coupling body 32 within the confines of the inlet space 44. A hollow body section 52 of the poppet valve 40 extends beyond the head portion 42 toward the O-ring 38. A clearance section 56 is formed in the coupling body 32 near the O-ring 38 and a clearance undercut 58 is formed in the poppet valve 40 between the head portion 44 and the body portion 52.

A plurality of elongated slots such as 60, 62 and 64 are provided in the body portion 52 extending axially along a longitudinal axis 66 of the female coupling member 14 from the head portion 42 of the poppet valve 40 to a skirt portion 68. The body section 52 defines a flow passage 70 that extends from the head portion 42 through the skirt portion 68. It should be noted that further reference to axial distances are intended to refer to the longitudinal axis 66.

An inlet end portion 72 of the female coupling 14, which surrounds the inlet space 44, is threaded at 74 to the fluid line 15 which extends from a fluid source (not shown).

The end portion 72 of the female coupling 14 includes a wire mesh screen 80, preferably formed of brass, sandwiched between a retainer 82 and a spacer ring 84. The retainer 82 is press-fit into the inlet end portion 72 whereas the spacer ring 84 bears against one side of a retaining ring 86. Preferably the retainer 82, the spacer 84 and retaining ring 86 are formed of stainless steel.

Figure 10:
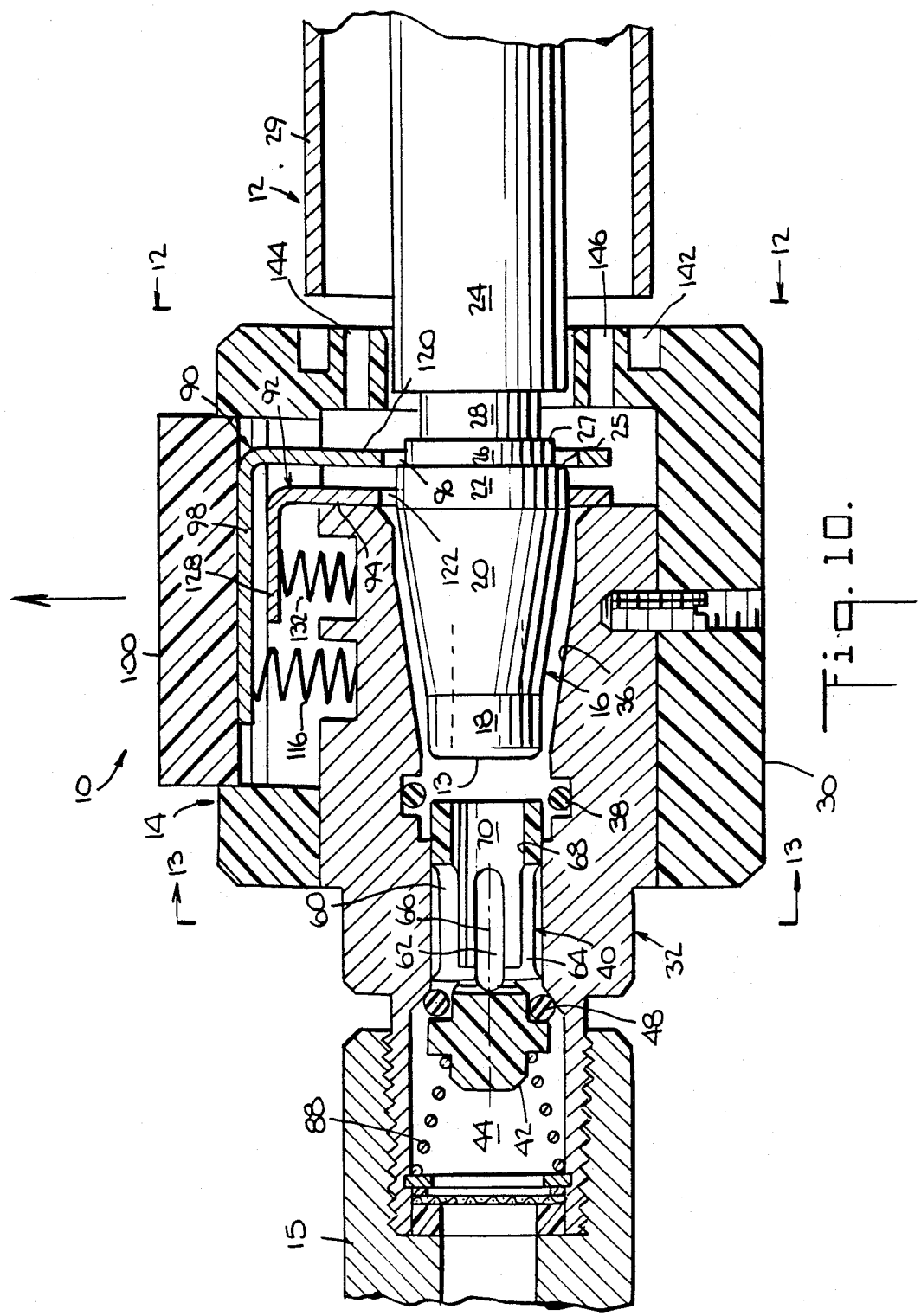
FIG. 10 is a view similar to FIG. 8 with the coupling members unlatched prior to separation thereof.

A coil spring 88 disposed in the inlet space 44 bears against an opposite side of the retaining ring 86 and the flange 46 of the poppet valve 40. Under this arrangement the coil spring 88 normally urges the poppet valve 40 in a closed condition as shown in FIG. 10 wherein the O-ring 48 seals off communication between the inlet space 44 and the flow space 54.

Figure 5:
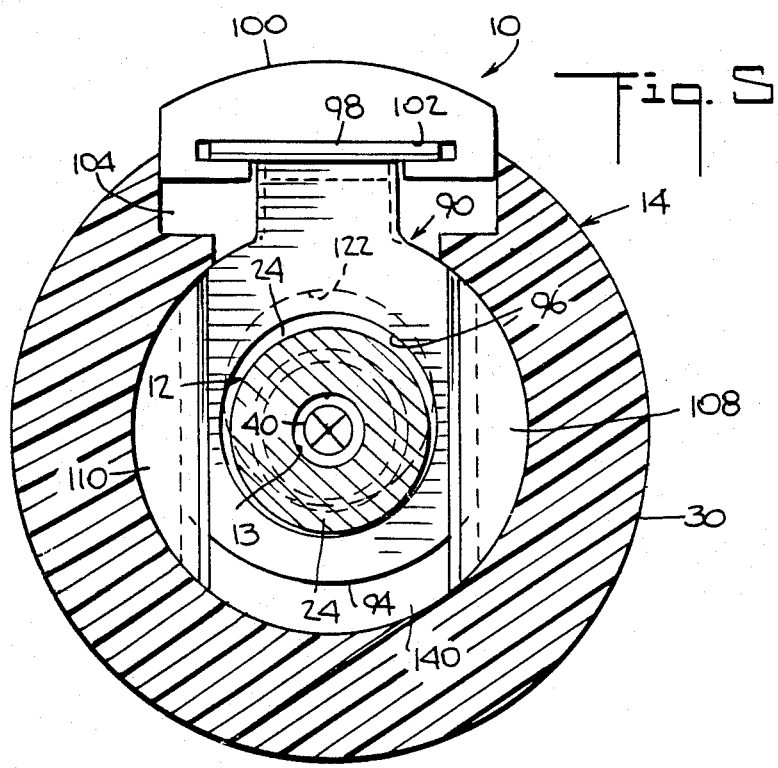
FIG. 5 is a sectional view taken along the line 5—5 of FIG. 4.
Figure 6:
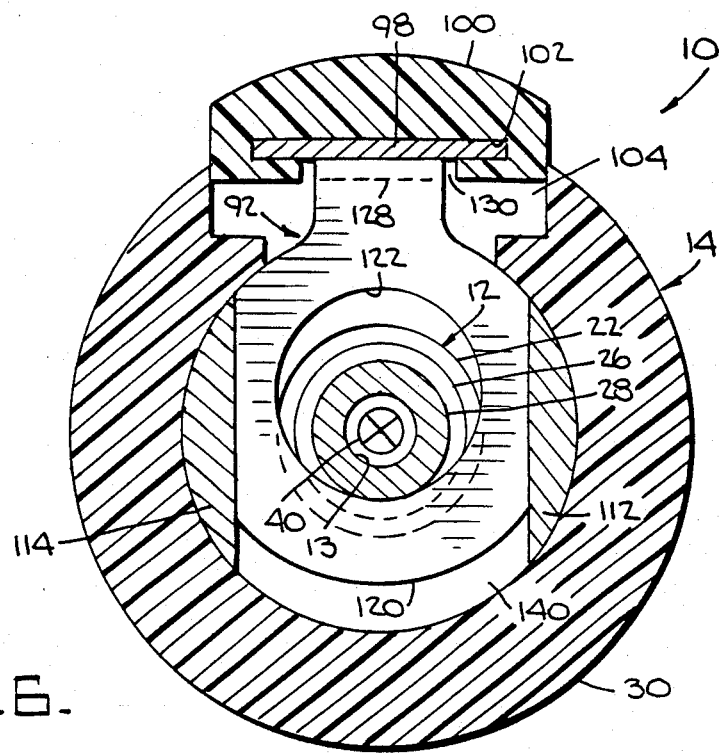
FIG. 6 is a sectional view taken along the line 6—6 of FIG. 4.

The female coupling 14 further includes first and second latching rings 90 and 92 which are L-shaped in cross-section as shown in FIG. 4 for example. The latching ring 90 includes a generally elliptical leg portion 94, also referred to as an interference member, having a circular opening 96 sized to accommodate the nipple 16 upon insertion of the male coupling 12 into the female coupling 14. The latching ring 90 also includes a generally rectangular leg portion 98 that is bent 90° with respect to the leg portion 94 and joined to an actuator button 100 by affixation in a slot 102 of the button 100 (FIGS. 5 and 6).

The button 100 is depressible in a recess 104 of the sleeve 30 to enable the elliptical leg portion 94 to move transversely in slots 106 and 107 (FIG. 3). The slots 106 and 107 are defined by oppositely disposed insert pieces 108 and 110 axially spaced from corresponding insert pieces 112 and 114 held in the sleeve 30.

A coil spring 116 based in a recess 118 of the coupling body 32 bears against the leg 98 and normally biases the button 100 to its unactuated position. The coil spring 116 also normally maintains the leg portion 94 in a position wherein the center of the opening 96 is offset from the axis 66 of the female coupling 14, as most clearly shown in FIG. 11.

The latching ring 92 includes a generally elliptical leg portion 120 having a circular opening 122 substantially equivalent in size to the opening 96 of the latching ring 90. The elliptical leg portion 120, also referred to as an interference member, is moveably confined in slots such 124 and 125 (FIG. 3). The slots 124 and 125 are defined between and end portion 126 of the coupling body 32 and the insert pieces 112 and 114.

The latching ring 92 also includes a generally rectangular leg portion 128 that is narrower and shorter than the leg portion 98 of the latching ring 90, and is receivable in a recess 130 (FIG. 6) of the botton 100. A coil spring 132, based in a recess 134 of the coupling body 32 bears against the leg portion 128 to bias the leg portion 128 toward the leg portion 98 of the latching ring 90.

Referring to FIG. 10, the leg portions 128 and 98 normally do not engage when the female coupling 14 is separated from the male coupling 12. In addition, the openings 122 and 96 of the leg portions 120 and 94 are normally misaligned a predetermined amount.

An end portion 136 of the sleeve 30 includes a central access opening 138 for the male coupling 12. The access opening 138 leads to an intermediate space 140 between the sleeve 30 and the coupling body 32. The intermediate space 140 also accommodates movement of the latching rings 90 and 92.

The end portion 136 further includes an annular recess 142 that receives the annular collar 29 of the male coupling 12 when the coupling members 12 and 14 are engaged. A plurality of pressure relief openings 144 and 146 in the end portion 136 extend into the intermediate space 140.

In using the coupling assembly 10, assume that the coupling members 12 and 14 are initially separated from each other such as shown in FIG. 11. Coupling or connection is accomplished by simply pushing the male coupling member 12 into the central access opening 138 of the female coupling member 14 until the nipple 16 is received in the nipple recess portion 36.

Insertion of the male coupling member 12 into the female coupling member 14 does not require external actuation of any mechanism of the female or male coupling members. When the male coupling member 12 is fully inserted in the female coupling member 14 the nipple 16 forces the poppet valve 40 into an open position by shifting the poppet valve to the left as noted from a comparison of FIG. 11 and FIG. 4.

With the poppet valve 40 in an open condition, fluid flows from the fluid source (not shown) through the wire screen 80, to the inlet space 44 past the O-ring 48 and clearance section 58 into the elongated slots 60, 62 and 64 of the poppet valve 40. Fluid then flows through the flow passage 70 of the poppet valve 40 into the passageway 13 of the male coupling 12.

A leak-tight joint between the poppet valve 40 and the male coupling member 12 is established by the O-ring 38 at the skirt portion 56 of the poppet valve 40 and the reduced end portion 18 of the nipple 16.

Referring to FIG. 4, The male coupling member 12 is held in position within the female coupling member 14 to permit fluid flow by engagement between the leg portion 120 of the latching ring 92 and the latch engaging stop surface 27 at the step 26 of the male coupling 12.

The opening 96 of the latching ring 90 is sized to clear the portion of the male coupling member 12 engaged in the female coupling 14. The opening 96 aligns with the male coupling 12 in the fluid flow position. Thus there is no engagement between the latching ring 90 and the male coupling member 12 during conditions of fluid flow from the female coupling member 14 through the male coupling 12.

Referring to FIG. 11, it will be noted that the opening 96 in the latching ring 90 is normally coaxial with the longitudinal axis 66 of the female coupling member 14. Consequently during insertion of the male coupling member 12 into the female coupling member 14, there is sufficient clearance between the male coupling member 12 and the opening 96 to avoid any engagement between the male coupling member 12 and the latching ring 90.

However, the opening 122 of the latching ring 92 which is also sized to clear the portion of male coupling member 12 engaged in the female coupling 14, is normally offset from the longitudinal axis 66 of the female coupling member 14. Consequently during insertion of the male coupling member 12 into the female coupling member 14, the camming portion 20 of the nipple 16 interfers with the leg portion 120 of the latching ring 92 as the nipple 16 passes through the opening 122 within the leg portion 120.

As a result of the interference between the nipple portion 16 and the leg portion 120, the leg portion 120 is cammed in a downward direction with respect to FIG. 11 by the camming section 20 of the nipple 16, in opposition to the force of the biasing spring 116. Thus as the nipple 16 moves through the opening 122 of the latching ring 92, the latching ring 92 exerts an upward force against the camming surface 20, and the short narrow section 22. The latching ring 92, under the influence of the biasing spring 116 snaps against the step 26 and eventually snaps against the step 28 to bear against the stop surface 27 at the step 26 thereby locking the male coupling member 12 into the female coupling member 14 in the fluid flow arrangement of FIG. 4.

The longitudinal dimensions of the nipple 16 of the male coupling member 12 are predetermined such that the reduced end 18 of the nipple 16 urges the poppet valve 40 into the open position of FIG. 4 when the latching ring 92 interferes with and thus latches against the stop surface 27. During engagement of the coupling members 12 and 14 in the fluid flow position, the annular collar 29 of the male coupling 12 engages the annular recess 142 of the female coupling member 14.

Figure 7:
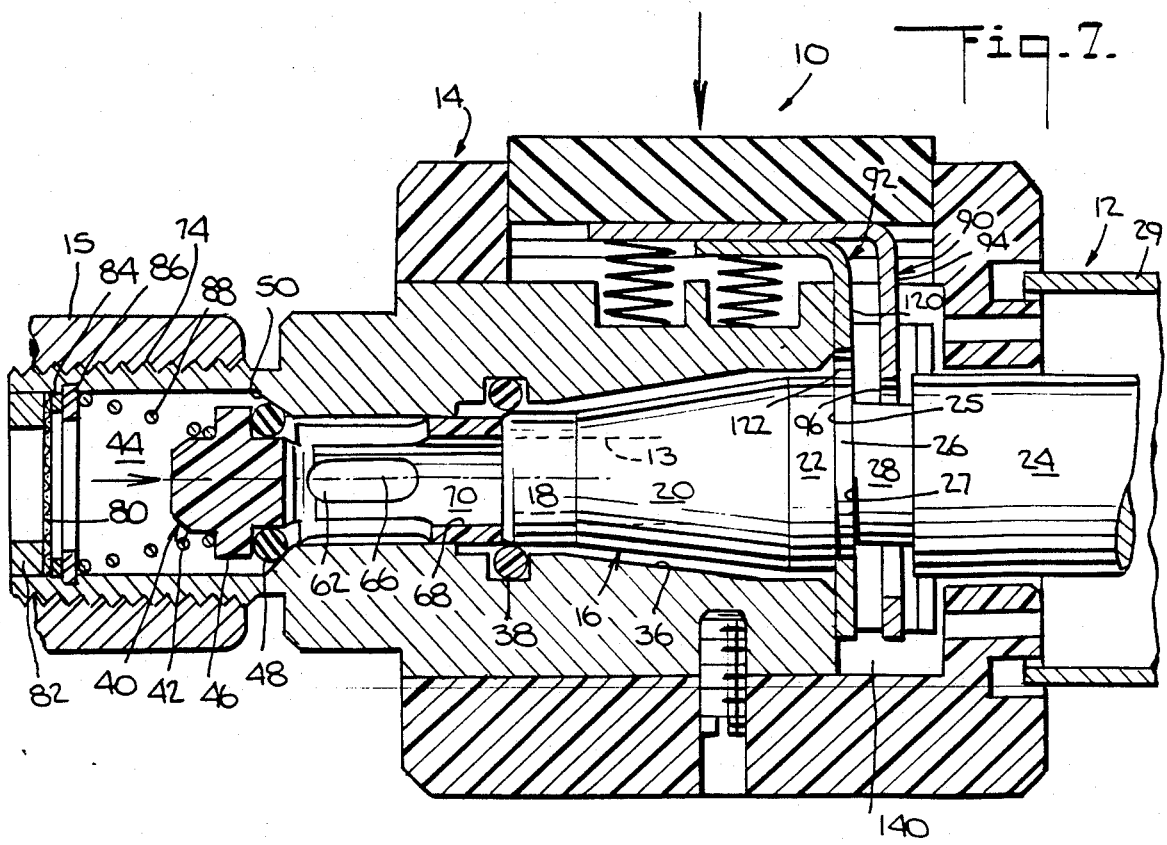
FIG. 7 is an enlarged fragmentary sectional view thereof with the coupling members positioned to shut-off fluid flow while under pressure.

To separate the coupling members 12 and 14 and shut off the flow of fluid through the coupling assembly the button 100 is depressed. Referring to FIG. 7 in comparison with FIG. 4, it will be noted that when the button 100 is depressed, the opening 122 of the latching ring 92 clears the step 26 of the male coupling member 12. The opening 96 of the latching ring 90 clears the step 28. Accordingly the coil spring 88 in the inlet space 44 urges the poppet valve 40 to the right along the longitudinal axis 66 by an amount equal to the axial width of the step 26, which can be referred to as the sealing distance.

When the poppet valve 40 has moved longitudinally by an amount equal to the sealing distance, the flange 46 of the head portion 42 forces the O-ring 48 against the tapered surface 50 thereby sealing the inlet space 44 to prevent fluid from flowing past the O-ring 48. In addition, the O-ring 38 maintains a seal around the reduced end portion 18 of the male coupling member 12. Consequently, although fluid flow is shut off when the coupling members are positioned as shown in FIG. 7, the male coupling member 12 remains pressurized.

The coupling assembly 10 is maintained in the position of FIG. 7 by engagement of the leg portion 120 of the latching ring 92 against a latch engaging stop surface 25 at the short narrow section 22. The leg portion 120 is also seated on the step 26 at the opening 122 thus limiting transverse movement of the leg portion 120.

Figure 8:
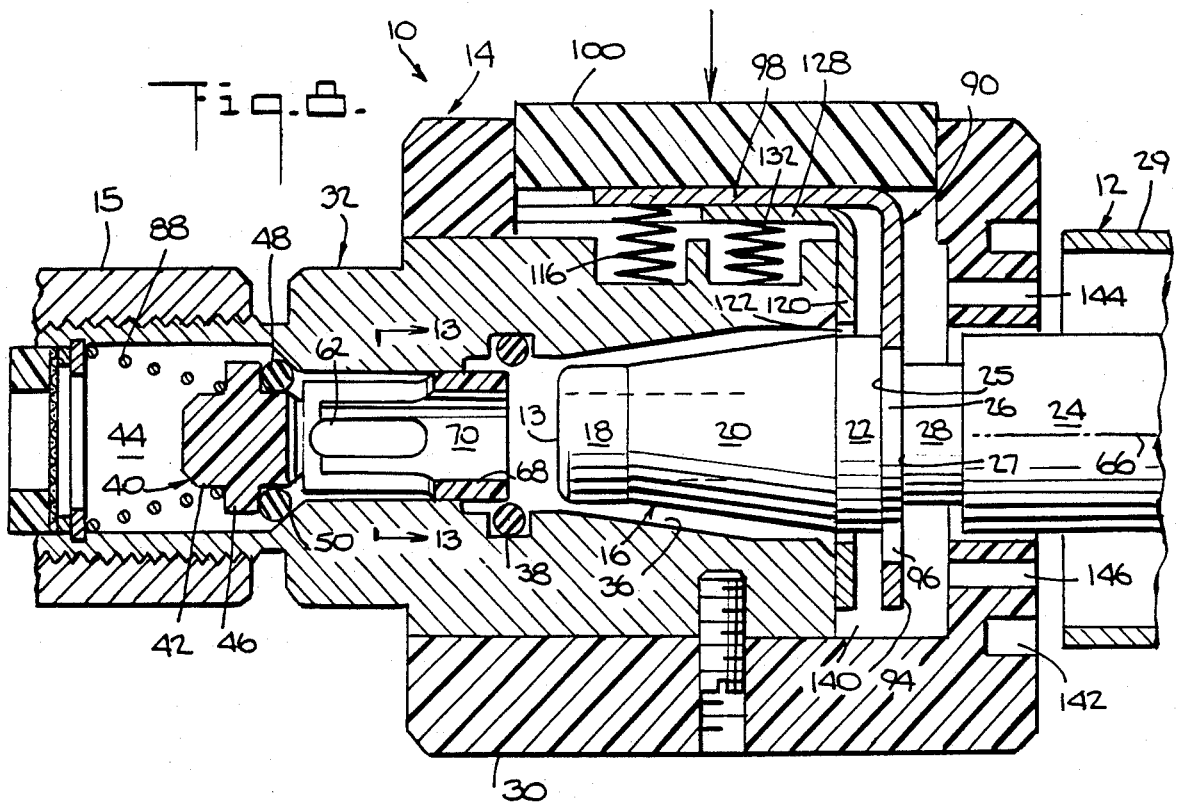
FIG. 8 is a view similar to FIG. 7 with the coupling members engaged to permit depressurization.
Figure 9:
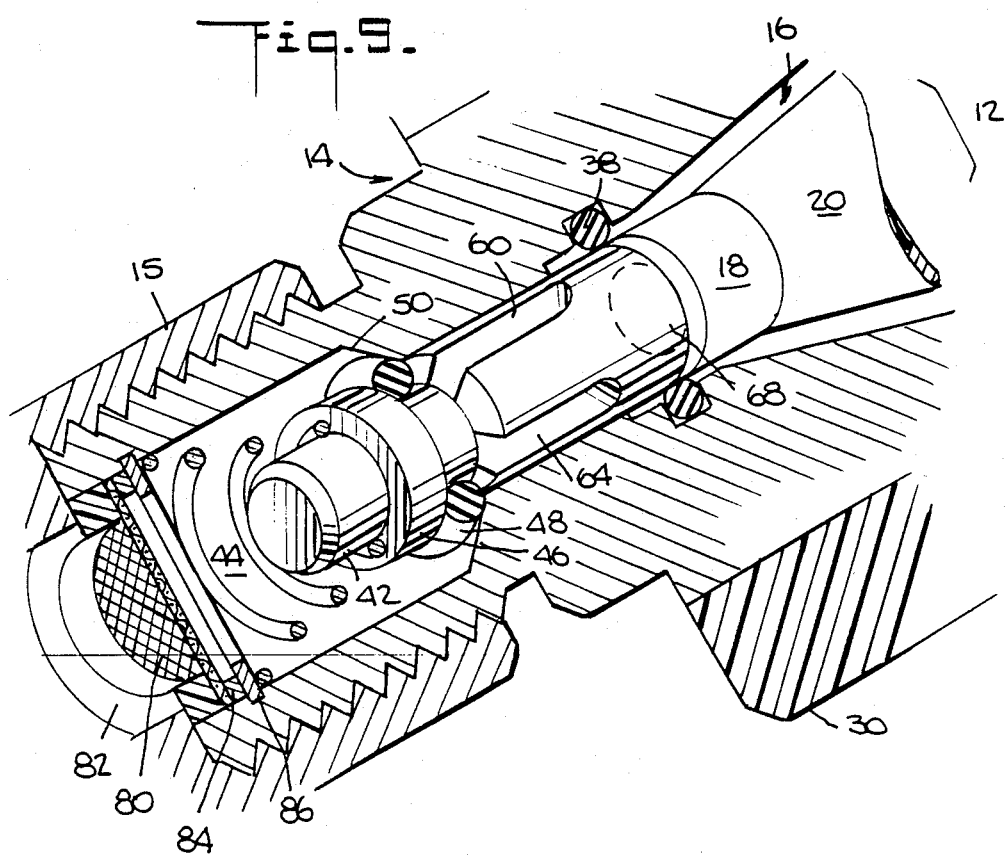
FIG. 9 is a fragmentary perspective view thereof, partly shown in section.

Referring to FIG. 8, further depression of the button 100 operates to depressurize the male coupling member 12. As the button 100 is depressed a predetermined amount beyond the position of FIG. 7 the opening 122 of the latching ring 92 clears the short narrow section 22 of the nipple 16.

However, after the button 100 is depressed a predetermined amount from the position of FIG. 4 the latching ring 90 is simultaneously depressed with the latching ring 92 which causes the opening 96 in the leg portion 94 to interfere with the short narrow section 22, as shown in FIG. 8. The leg portion 94 thus engages against the stop surface 25 to prevent the male coupling member 12 from being removed from the female coupling member 14 as long as the button 100 is held in its depressed position.

Engagement of the leg portion 94 and the stop surface 25 occurs when the male coupling member 12 moves outwardly from the female coupling member 14. Movement of the male coupling member 12 during depressurization usually causes such engagement.

The male coupling member 12 in its movement from the position of FIG. 7 to the position of FIG. 8, moves an axial distance equal to the distance between corresponding surfaces of the leg portions 120 and 94. As a result of such movement, the reduced end 18 of the nipple 16 is spaced from the O-ring 38 as well as the body portion 52 of the poppet valve 40. Pressure within the passage 13 of the male coupling 12 is then permitted to escape at the reduced end 18 of the nipple 16 for exhaustion through the nipple recess portion 36, the intermediate space 140 and the pressure relief openings 144 and 146.

Depressurization of the male coupling member 12 thus occurs while the coupling member 12 is latched to the female coupling member 14 by engagement of the latching ring 90 against the stop surface 25 of the male coupling member 12.

Referring to FIG. 11 in comparison with FIG. 8, release or deactuation of the button 100 enables the biasing springs 118 and 134 to urge the respective latching rings 90 and 92 into their normal positions wherein the opening 96 of the latching ring 90 aligns with the longitudinal axis 66 of the female coupling member 14. The normal position of the latching ring 92 provides a misalignment of the opening 122 with the longitudinal axis 66.

However, as the latching ring 92 moves into interference with the nipple 16 during release of the button 100, the opening 122 encircles and engages the camming section 20. Since the widest portion of camming section 20 is moved away from the latching ring 92, such interference does not prevent withdrawal of the male coupling member 12 from the female coupling member 14 to a separation condition as shown in FIG. 11.

As the male coupling member 12 is depressurized while still latched to the female coupling member 14 and depressurization occurs before separation of the male coupling 12 from the female coupling member 14, there is no "shooting away" of the male coupling member 12 from the female coupling member 14 during separation of the coupling members. Thus, the process of shutting off fluid flow from the female coupling member 14 to the male coupling member 12 and the depressurization of the male coupling member 12 are accomplished with one depression of the button 100. The separation of the male coupling member 12 from the female coupling member 14 is further accomplished when the botton 100 is deactuated or released from its depressed condition, and returns to its unactuated position. Consequently only one actuation cycle of the button 100 is required for separation of the coupling members thereby providing a quick and a safe uncoupling of the coupling assembly.

In another embodiment of the invention, the poppet valve 40 of the coupling assembly 10 is replaced by the poppet valve 150 of FIG. 14.

Referring to FIG. 14, the poppet valve 150 includes a head portion 152 with a flange 154 and a body portion 156 extending from the head portion 152. Although not shown, when the poppet valve 150 is positioned in the female coupling 14, the head portion 152 is disposed in the head space 44 with the flange 154 engaging the spring 88.

A peripheral channel 158 is formed in the head portion 152 to accommodate an O-ring 160. The body portion 156 is open-ended with an end taper 162 and includes a flow passage 164 that communicates with peripheral ports such as 166, 168 and 170. The outside diameter of the body portion 156 is sized to permit slideable movement in the flow space 54 of the female coupling 14 in a manner similar to that described for the poppet valve 40. An end portion of the O-ring 160 seals against the tapered surface 50 of the female coupling 14 to shut off fluid flow when the male coupling 12 is separated from the female coupling 14.

In using the poppet valve 150 of FIG. 14 in a coupling assembly arrangement similar to that shown in FIG. 4, fluid flows past the poppet valve flange 154 into the ports 166, 168 and 170 and through the flow passage 164 to the male coupling 12. Operation of a coupling assembly using the poppet valve 150 is otherwise similar to the operation described for the coupling assembly 10.

A coupling assembly incorporating another embodiment of the invention is generally indicated by the reference number 180 in FIG. 15. The coupling assembly 180 includes a male coupling member 182, and a female coupling member 184 identical to the female coupling member 14.

The male coupling member 182 includes a nipple 186 having a reduced finished end 188, a tapered camming section 190 and a narrow section 192 similar to the finished end 18, the tapered camming section 20 and the narrow section 22 of the nipple 16. The narrow section 192 is spaced from an enlarged elongated section 194 of identical diameter by a reduced section 196. An annular channel 198 is thus defined between the narrow section 192 and the enlarged elongated section 194.

The remaining structure of the male coupling member 182 is similar to that of the male coupling member 12.

In using the coupling assembly 180, the male coupling member 182 is fully inserted into the female coupling member 184 as shown in FIG. 15, wherein the latching ring 92 bears against a latch engaging stop surface 193 at an end of the enlarged narrow section 192 within the annular channel 198. The latching ring 192 thus latches the male coupling member 182 to the female coupling member 184 in a position which permits fluid to flow through the coupling assembly 180.

The reduced finished end 188 of the nipple 186 thus forces the poppet valve 40 into an open condition wherein fluid flows through the inlet space 44 into the flow passage 70 and through the fluid passage 13 of the male coupling member 182.

In the fluid flow arrangement of FIG. 15, there is no engagement between the latching ring 90 and the male coupling member 182, since the opening 96 of the latching ring 90 clears the male coupling member 182 and normally aligns with the longitudinal axis 66 of the coupling assembly 180. Thus there is no interference between the latching ring 90 and the male coupling member 182 during insertion of the male coupling member 182 into the female coupling member 184.

The opening 122 in the latching ring 92 is normally out of alignment with the opening 96 and also misaligns with the longitudinal axis 66 of the coupling assembly 180. The opening 122 thus interferes with the nipple 186 during insertion of the male coupling member 182 in the female coupling member 184. The tapered camming section 190 of the nipple 186 cams the latching ring 92 along the peripheral surface of the nipple 186 to permit the latching ring 92 to snap into the annular channel 198 and engage the stop surface 193 when the male coupling member 182 is fully engaged in the female coupling member 184.

When it is desired to separate the male coupling member 182 from the female coupling member 184 the button 100 is depressed to effect simultaneous downward movement of the latching rings 90 and 92.

Depression of the latching ring 92 places the opening 122 into alignment with the longitudinal axis 66 of the coupling assembly and also places the opening 96 of the latching ring 90 out of alignment with the longitudinal axis 66. The opening 122 in the latching ring 92 thus clears the male coupling member 182, enabling the spring 88 in the inlet space 44 to urge the poppet valve 40 into a closed position and also force the nipple 186 of the male coupling member 182 to the right with reference to FIG. 15.

As long as the button 100 is depressed, the nipple 186 is limited in its movement to the right by interference between the latching ring 90 and the stop surface 193. Although this interference condition or latching position is not shown, the interference between the latching ring 90 and the stop surface 193 occurs when the male coupling member 182 moves outwardly from the female coupling member 184. Such engagement usually occurs during depressurization.

Thus, when the button 100 is depressed, the male coupling member 182 cannot be separated from the female coupling member 184 even though fluid flow to the male coupling member 182 has been shut off by the poppet valve 40. However, the axial distance travelled by the male coupling member 182 to the right, with reference to FIG. 15, is predetermined by the distance between corresponding surfaces of the leg portion 94 and 120. This distance is predetermined to permit the reduced end 188 of the nipple 186 to unseal from the O-ring 38 and allow the male coupling member 182 to depressurize. Depressurization occurs when fluid within the passage 13 of the male coupling member 182 is permitted to escape at the reduced end 18 of the nipple 186 for exhaustion through the nipple recess portion 36 and out the pressure relief openings 144 and 146.

Separation of the male coupling member 182 from the female coupling member 184 is accomplished when the button 100 is deactuated or released to enable the opening 96 of the latching ring 90 to align with the longitudinal axis 66 and thereby clear the portion of the male coupling 182 engaged in the female coupling 184. Clearance between male coupling 182 and the opening 122 of the latching ring 92 is accomplished when the button 100 is initially depressed.

Since the latching rings 90 and 92 no longer interfere with the nipple 186 of the male coupling member 182, separation of the male coupling member 182 is accomplished by pulling the male coupling member 182 from the female coupling member 184.

Consequently, there is no shooting away of the male coupling member 182 from the female coupling member 184 during the separation of the coupling members since the coupling members are latched together during the depressurization operation.

Some advantages of the present invention evident from the foregoing description include a coupling assembly that can be used on high pressure fluid systems by personnel that require no special skills or training, a coupling assembly that can be fully depressurized while the coupling members are latched together, and a coupling assembly that can be quickly and safely disconnected with one actuation of a release button.

In view of the above, it will be seen that the several objects of the invention are achieved and other advantageous results attained.

As various changes can be made in the above constructions and method without departing from the scope of the invention, it is intended that all matter contained in the above description or shown in the accompanying drawings shall be interpreted as illustrative and not in a limiting sense.

What is claimed is:

1. A coupling assembly comprising,
   (a) a pair of interengageable and separable coupling members having a longitudinal axis, said coupling members moveable into engagement and disengagement along said longitudinal axis,
   (b) moveable latching means on one of said coupling members and latch engaging means on the other coupling member for latching said one coupling member to the other coupling member, said latching means including a pair of interference members moveable transversely of said longitudinal axis and said latch engaging means including a first stop surface engageable with one of said interference members in said first latching position, and a second stop surface spaced from said first stop surface,
   (c) said latching means and said latch engaging means having a first latching position for latching said coupling members together in a fluid flow position to permit fluid flow through said coupling members, said latching means and said latch engaging means having a second latching position for latching said coupling members together in a depressurization position wherein fluid cannot flow through said coupling members and said coupling assembly depressurizes, said second stop surface being engageable with the other interference member in said second latching position, said latching means and said latch engaging means being unlatchable to permit separation of said coupling members, and
   (d) actuating means comprising a button on said one coupling member for actuating movement of said latching means, in a first direction when said coupling assembly is in said fluid flow position to move said latching means form said first latching position to said second latching position to permit placement of said coupling members in said depressurization position, said actuating button being deactuatable in a reverse direction to said first direction when said coupling assembly is in said depressurization position in order to move said latching means from said second latching position to said unlatched position and permit separation of said coupling members.

2. The coupling assembly as claimed in claim 1 wherein one of said coupling members is a male member and the other said coupling member is a female member, said latching means being provided on said female coupling member and said latch engaging means being provided on said male coupling member.

3. The coupling assembly as claimed in claim 1 having a longitudinal axis, and said latching means are moveable transversely of said longitudinal axis.

4. The coupling assembly as claimed in claim 3 wherein said latch engaging means are moveable in the direction of said longitudinal axis.

5. The coupling assembly as claimed in claim 1 wherein said second stop surface is engageable with said one interference member when said coupling members are in an intermediate position between said fluid flow position and said depressurization position wherein fluid flow is shut off and said coupling assembly remains pressurized.

6. The coupling assembly as claimed in claim 1 wherein said interference members encircle said male coupling member when said male coupling member is engaged in said female coupling member.

7. The coupling assembly is claimed in claim 6 wherein said interference members each have an interfering surface spaced a first predetermined distance along said longitudinal axis and said male coupling member is moveable said first predetermined distance from the fluid flow position to said depressurization position.

8. The coupling assembly as claimed in claim 6 wherein said interference members each have an opening sized to clear said male coupling member, said openings being normally out of alignment with each other by a first predetermined amount such that movement of said actuating means in said first direction effects movement of said interference members to position one of said openings to clear said male coupling member and to position the other said opening to interfere with said male coupling member, and movement of said actuating means in a reverse direction to said first direction effects movement of said interference members to clear the other said opening with said male coupling member and cause interference between said one opening and said male coupling member.

9. The coupling assembly as claimed in claim 8 wherein in said first latching position, the opening in said one interference member is positioned to permit engagement of said one interference member with said one stop surface and the opening in said other interference member is positioned to clear said male coupling member.

10. The coupling assembly as claimed in claim 9 wherein said one stop surface is engageable with the other interference member in said second latching position.

11. The coupling assembly as claimed in claim 8 wherein said one stop surface is engageable with the other interference member in said second latching position and, in said second latching position, the opening in the other interference member is positioned to permit engagement of the other interference member with said one stop surface, and the opening in said one interference member is positioned to clear said male coupling member.

12. The coupling assembly as claimed in claim 8 wherein said latch engaging means comprise a second stop surface spaced from said first stop surface, said second stop surface being engageable with the other interference member in said second latching position, and in said second latching position, the opening in the other interference member is positioned to permit engagement of the other interference member with said second stop surface, and the opening in said one interference member is positioned to clear said male coupling member.

13. The coupling assembly as claimed in claim 12 wherein said latch engaging means comprise two stop surfaces spaced a second predetermined distance along said longitudinal axis, said second predetermined distance being less than said first predetermined distance.

14. The coupling assembly as claimed in claim 12 wherein said second stop surface is engageable with said one interference member when said coupling members are in an intermediate position between said fluid flow position and said depressurization position, wherein fluid flow is shut off and said coupling assembly remains pressurized, and in said intermediate position, the opening in said one interference member is positioned to permit engagement of said one interference member with said second stop surface, and the opening in said other interference member is positioned to clear said male coupling member.

15. The coupling assembly as claimed in claim 1 wherein said actuating means comprise a depressible member connected to at least one of said interference members.

16. The coupling assembly as claimed in claim 15 wherein said depressible member effects movement in said interference member when said depressible member is depressed in said first direction.

17. The coupling assembly of claim 1 wherein said actuating means is biased to move from said first direction to said reverse direction by a spring.

18. The coupling assembly of claim 17 wherein said latching means include a pair of moveable interference members, said latch engaging means including a first stop surface engageable with one of said interference members in said first latching position, and a second stop surface spaced from said first stop surface being engageable with the other interference member in said second latching position.

19. A coupling assembly comprising,
(a) a pair of coupling members having an internal longitudinal axis, said coupling members being attachable and separable along said longitudinal axis,
(b) latching means on one of said coupling members for maintaining said coupling members together in a first condition to permit fluid flow through said coupling members for maintaining said coupling members together in a second condition that permits depressurization of said coupling assembly, said latching means being releasable from the other coupling member to permit separation of said coupling members, and
(c) actuating means comprising a button moveable toward the longitudinal axis to permit movement of said coupling members from said first condition to said second condition, movement of said actuating means away from the longitudinal axis to permit separation of said coupling members.

20. A method of safely disconnecting a coupling assembly that includes a male coupling member and a female coupling member having an internal longitudinal axis, the coupling members being attachable and separable along the longitudinal axis comprising, (a) providing a first latching position of the coupling members which holds the coupling members together in a fluid flow condition,
(b) providing a second latching position for the coupling members that holds the coupling members together in a non-fluid flow condition and enables the coupling assembly to depressurize,
(c) providing an unlatched position for the coupling members which permits separation of the coupling members,
(d) preventing the coupling members from reaching the unlatched position until the coupling members have first passed through the second latching position,
(e) actuating movement of the coupling assembly from the first latching position to the second latching position by depressing an actuating button toward the longitudinal axis, and
(f) actuating movement of the coupling assembly from the second latching position to the unlatched position by releasing the actuating button to move away from the longitudinal axis.

21. The method of claim 20 including the step of providing an intermediate latching position between the first and second latching positions wherein the coupling assembly does not permit fluid flow but remains pressurized.

22. A coupling assembly comprising,
(a) a pair of interengageable and separable coupling members having an internal longitudinal axis, said coupling members being attachable and separable along the longitudinal axis,
(b) moveable latching means on one of said coupling members and latch engaging means on the other coupling member for latching said one coupling member to the other coupling member,
(c) said latching means and said latch engaging means having a first latching position for latching said coupling members together in a fluid flow position to permit fluid flow through said coupling members, said latching means and said latch engaging means having a second latch position for latching said coupling members together in a depressurizaton position wherein fluid cannot flow through said coupling members and said coupling assembly depressurizes, said latching means and said latch engaging means being unlatchable to permit separation of said coupling members, and
(d) a releasably depressible actuating botton on said one coupling member for actuating movement of said latching means, said actuating button being depressible toward the longitudinal axis when said coupling assembly is in said fluid flow position to move said latching means from said first latching position to said second latching position to permit placement of said coupling members in said depressurization position, said actuating button being releasable away from the longitudinal axis when said coupling assembly is in said depressurization position, to move said latching means from said second latching position to said unlatched position to permit separation of said coupling members.

* * * * *